July 9, 1968    P. P. RIGGS    3,391,531
STRAND AND ROPE
Filed March 11, 1966    2 Sheets-Sheet 1

July 9, 1968 P. P. RIGGS 3,391,531
STRAND AND ROPE

Filed March 11, 1966 2 Sheets-Sheet 2

United States Patent Office 3,391,531
Patented July 9, 1968

3,391,531
STRAND AND ROPE
Peter P. Riggs, Cattawade, near Manningtree, Essex, England, assignor to MacWhyte Company, Kenosha, Wis., a corporation of Wisconsin
Filed Mar. 11, 1966, Ser. No. 533,683
Claims priority, application Great Britain, Mar. 22, 1965, 12,043/65
13 Claims. (Cl. 57—149)

ABSTRACT OF THE DISCLOSURE

A wire rope strand and a rope made from it which comprises a plastics spacer between some of the individual wires in the strand, and the strands in the rope to thereby space the wire and strands from one another to facilitate ingress of plastics material into the spaces. The plastics spacer may either be a sheath surrounding a wire, or an element inserted between adjacent wires.

---

The invention relates to strands for wire ropes, cables and the like (for convenience hereinafter referred to simply as ropes).

It is often desirable that preferably all the strands in a rope and preferably also some or all the wires in each strand are intentionally spaced apart over at least portions of their length to permit the ingress of a plastics material, for example extruded polyvinyl chloride or nylon. The spaces not only facilitate penetration of the plastics between the wires and strands but they also ensure that the plastics is properly keyed in place. The walls of plastics material that are formed between the wires and strands minimise abrasion between the wires and prevent the intrusion of dirt and corrosive substrances, thereby increasing the life of the rope.

I have devised a particularly convenient manner of achieving a controlled spacing between the strands in a rope. In essence, this involves the provision of at least one oversize wire in an outer lay of twisted wires in each strand so that neighbouring strands can be in contact at least with their oversize wires at intervals along the length of the rope but are spaced apart elsewhere to permit the ingress of plastics material.

Whilst such strands and the ropes made therefrom are satisfactory, I have now developed what I believe to be a considerable improvement in quality and economy in production. With an oversize wire it may be difficult accurately to predict the behaviour of the strand under load because the protruding part of the oversize wire may bear the load before the other wires in the strand. Also, it may be generally inconvenient and more expensive to work with other than standard wire sizes.

The present invention, therefore, primarily aims to provide a controlled spacing between the strands in a rope and yet permit the use of standard wire sizes whereby a rope having strands which are twisted together to form spaces between the strands at intervals along their lengths are provided. However, it is another aim to permit such controlled spacing to be obtained by means which are also applicable for obtaining a controlled spacing between the individual wires in a strand whereby the strand, in its completed condition includes a plastics spacer between at least two adjacent wires which conforms to the twist of the ropes.

According to the present invention, a plastics spacer is provided between at least two adjacent twisted wires in a strand in conformity with the twist of said wires. This plastics spacer is not to be confused with the plastics material with which the strand or rope is subsequently impregnated, even though it may be of the same composition. By plastics spacer I mean plastics spacing means which are pre-applied to a wire or between wires to bring about the spaces finally occupied by the impregnating plastics and this definition of "plastics spacer" is to be used in construing this specification.

In one form of the invention, in a strand of twisted wires of which preferably all have substantially the same diameter, the plastics spacer projects radially beyond the strand so that, when two or more such strands form a twisted rope, a spacing for impregnating plastics is obtainable between the strands at intervals along their length.

It should be understood that the reference to twisted wires of substantially the same diameter is not intended to include any core that may be incorporated in the strand. The core (if used) can be a larger diameter king wire as hitherto.

The radially projecting spacer may be in the form of a preapplied sheath of plastics material provided on one, or an individual such sheath on a pluraity but preferably not exceeding half, of the twisted wires that make up the outer lay of the strand.

Apart from achieving a controlled spacing between adjacent strands, a sheathed wire can be usefully employed in an inner lay with a view to obtaining a spacing between the individual twisted wires in each strand. In the final rope, the protruding plastics spacer material is soon worn away and can be neglected in calculating the strength of the rope.

In cases where the sheathed wires could block or hinder the intrusion of the plastics material with which it is desired to impregnate the strand or rope, the sheaths may be provided with projections or recesses to form passages facilitating the plastics material to reach the spaces between the individual inner wires.

In another form the invention, which, again, is applicable for obtaining a controlled spacing between the twisted wires inside a strand as well as between the adjacent strands in a twisted rope, the plastics spacer is in the form of a pre-formed insert between adjacent wires. The insert can likewise be formed with passages to facilitate penetration of the impregnating plastics material.

Examples of the invention are illustrated in the accompanying drawings wherein.

Figure 1:
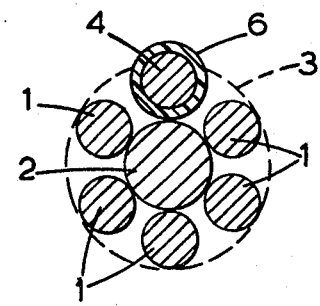
FIG. 1 is a cross-section through a twisted strand for a rope, one of the twisted wires being provided with a plastics sheath.

Referring to FIG. 1, there is shown a strand comprising a lay of five metal wires 1 of substantially equal diameter twisted about a core 2 at a spacing from one another over at least a portion of their length and so that, as viewed in cross-section, they are in substantially tangential contact with a common imaginary enveloping circle 3. A sixth wire 4, which is also twisted about the core and is of substantially the same diameter as the wires 1, is provided with a pre-applied sheath 6 of thermoplastics material such as polyvinyl chloride which projects radially beyond the circle 3. The sheath 6 may be a coating applied to the wire 4 or it may be in the form of a prefabricated and preapplied sleeve. Plastics material such as polyvinyl chloride can be readily intruded into the spaces between the wires and, in cases where the final rope consists of no more than this single strand, may be continued radially outwardly beyond the strand, i.e. beyond the circle 3.

Figure 8:
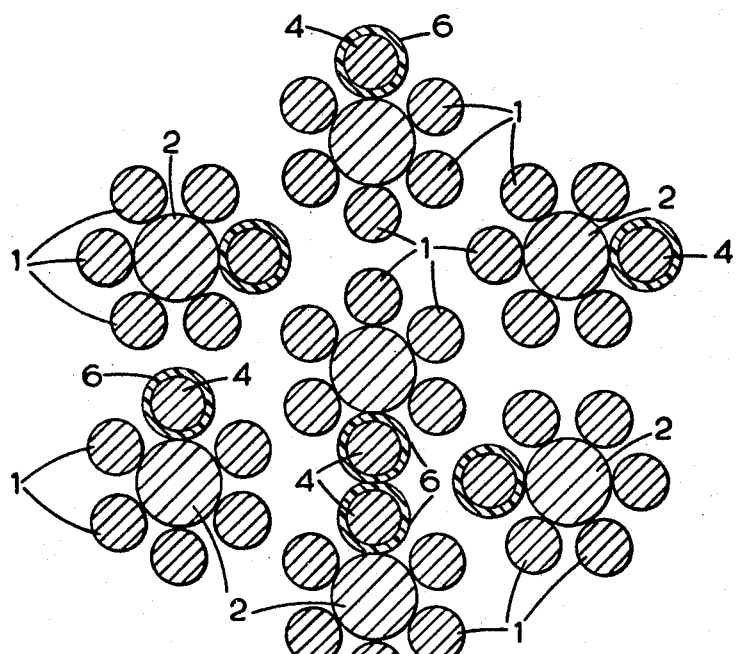
FIG. 8 is a cross-section through a rope comprising strands according to the FIG. 1 embodiment.

The core 2 may be a king wire as shown, or any other suitable material such as hemp, manilla or plastics. When a plurality of such strands are themselves twisted about a further core of any suitable material to form a rope, a spacing is formed between the strands and also between each strand and the further core along most of their length by virtue of the protruding sheath 6 in each strand. This is illustrated in FIG. 8 where six stands according to FIG. 1 are twisted about a further core, i.e. a rope core, that is itself in the form of a strand in accordance with FIG. 1. All the spaces are subsequently filled with thermoplastics material.

Figure 2:
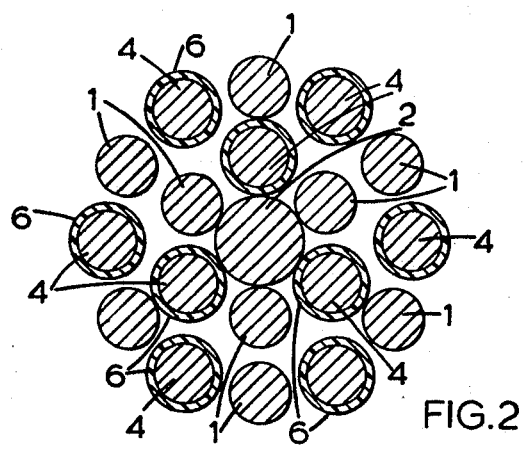
FIG. 2 is a similar view of a strand in which half the twisted wires are individually sheathed.

Additional sheaths 6 may be provided, as is shown for the inner and outer lays of wires in the strand of FIG. 2, but it is preferred that the number of sheathed wires does not exceed half the wires in each lay. In FIG. 2, sheaths are provided on the alternate wires tin each lay.

Figure 3:
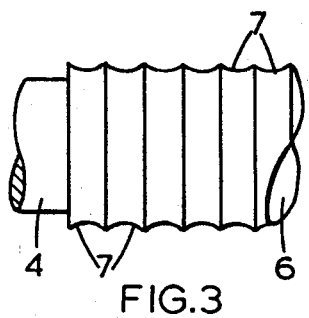
FIG. 3 is an enlarged fragmentary side elevation of a wire whose sheath is formed with ribs or grooves.
Figure 4:
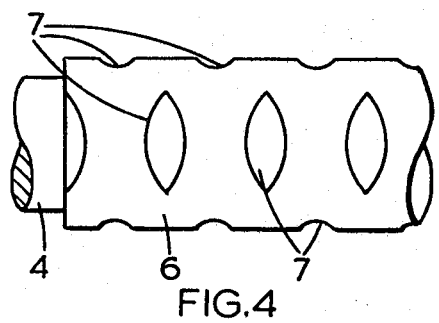
FIG. 4 is an enlarged fragmentary side elevation of a wire whose sheath is formed with knurling or notches.

As shown in FIGS. 3 and 4, the sheaths 6 may be provided with projections or recesses which form passages 7 to facilitate the entry of impregnating plastics past those places where the sheaths are in contact with neighbouring wires. In FIG. 3 the passages are in the form of circumferential grooves and in FIG. 4 they are non-communicating notches or depressions. With such passages 7, it does not matter whether all the wires in each strand are spaced from one another, as is illustrated in FIG. 2, or whether the sheaths 6 are in contact with the neighbouring unsheathed wires 1.

Figure 5:
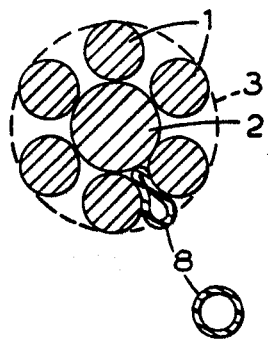
FIGS. 5 to 7 are composite cross-sectional views, each showing a different kind of plastics insert in a strand and the respective insert before it was incorporated in the strand.
Figure 6:
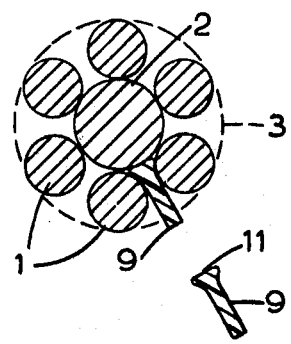
Figure 7:
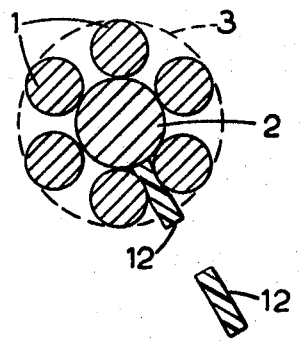

In FIGS. 5 to 7, P.V.C. spacers in the form of preformed inserts are applied between at least two adjacent twisted wires 1 to project beyond the common imaginary enveloping circle 3. In FIG. 5 the insert is a tube 8 which assumes a flattened shape where it is squeezed by the adjoining wires. FIG. 6 shows a strip 9 of P.V.C., one edge of which is enlarged to form a longitudinal bead 11 of wedge-shaped configuration so as to approximate the shape of the gap that is left between adjacent wires in the vicinity of the core 2. The FIG. 7 construction employs a plain strip 12 of P.V.C. which may become slightly deformed after insertion, as illustrated. In all cases, the spacer is twisted about the king wire or core 2 in the same way as the wires 1 and thus conforms to the twist of the wires.

In any of FIGS. 5 to 7, the spacer may be indefinitely long, i.e. continuous to be co-terminous with the strand. However, short lengths can also be used. Further, these spacers may be formed with passages as hereinbefore described, for example by means of transverse serrations or corrugations. If desired, the spacers may be included between each alternate pair of wires in each lay.

The invention extends to any of the hereinbefore described strands having plastics material, for example P.V.C., intruded into the spaces to form walls between the wires; to ropes made from such strands, either as a semi-finished product or as a final product impregnated with plastics material; to a method of making any of the aforementioned strands comprising the step of twisting individual wires together or about a core with a plastics spacer provided around at least one of the twisted wires or between at least two adjacent such wires; and to a method of making a multi-strand rope comprising the step of twisting together or twisting about a core two or more strands each of which has in its outer lay of twisted wires at least one plastics spacer that is provided around one of the twisted wires or between two adjacent wires and projects radially outwardly beyond the outer lay in the strand.

I claim:

1. A strand for a rope, comprising a plurality of twisted wires and a plastics spacer provided between at least two adacent said wires conforming to the twist of said two wires, there being passages formed in the said spacer to facilitate the intrusion of impregnated plastics material.

2. A strand for a rope, comprising a plurality of twisted wires and a plastics spacer provided between at least two adjacent said wires conforming to the twist of said two wires, said spacer comprising a pre-applied sheath of plastics material provided on one of said two adjacent wires.

3. A strand according to claim 2 wherein the sheath is in the form of a coating on said one wire.

4. A strand according to claim 2 wherein the sheath is in the form of a prefabricated sleeve around said one wire.

5. A strand according to claim 2 wherein the number of sheathed wires does not exceed half the number of wires in each lay of the strand.

6. A strand for a rope, comprising a plurality of twisted wires and a plastics spacer provided between at least two adjacent said wires conforming to the twist of said two wires, said spacer comprising a pre-formed insert in the form of a flattened tube between the said two ajacent wires.

7. A strand for a rope comprising a plurality of twisted wires and a plastics spacer provided between at least two adjacent said wires conforming to the twist of said two wires, said spacer comprising a pre-formed insert in the form of a strip having an enlarged beaded edge between the said two adjacent wires.

8. A strand for a rope, comprising a plurality of twisted wires and a plastics spacer provided between at least two adjacent said wires conforming to the twist of said two wires, wherein all the twisted wires are of substantially the same diameter, with the outer lay being in substantially tangential contact with a common imaginary enveloping circle, the said spacer projecting radially beyond the said circle.

9. A rope comprising at least two strands according to claim 8 which are twisted together to form spaces between the strands at intervals along their lengths.

10. A rope according to claim 9 wherein the strands are twisted about a core and spaces are also formed between each strand and the core.

11. A rope according to claim 10 wherein the core is itself a strand wherein all the twisted wires are of substantially the same diameter, with the outer lay being in substantially tangential contact with a common imaginary enveloping circle, the said spacer projecting radially beyond the said circle.

12. A rope according to claim 9 including plastics material intruded in the spaces between adjacent wires and strands.

13. A strand for a rope, comprising a plurality of twisted wires and a plastics spacer provided between at least two adjacent said wires conforming to the twist of said two wires, said plastics spacer extending radially outwardly beyond at least one of the two adjacent wires with which it is associated.

(References on following page)

References Cited

UNITED STATES PATENTS

| | | | |
|---|---|---|---|
| 2,018,230 | 10/1935 | Robertson | 57—149 XR |
| 2,067,405 | 1/1937 | Mayne | 57—146 XR |
| 2,098,163 | 11/1937 | Reed | 57—145 XR |
| 2,485,019 | 10/1949 | Somerville | 57—153 |
| 2,509,894 | 5/1950 | Toulmin et al. | 57—149 |
| 3,131,530 | 5/1964 | Dietz | 57—149 |
| 3,133,584 | 5/1964 | Lang | 57—149 XR |
| 3,195,299 | 7/1965 | Dietz | 57—149 |
| 3,154,910 | 11/1964 | Dietz | 57—149 |
| 3,188,791 | 6/1965 | Grimes et al. | 57—145 |

FOREIGN PATENTS 520,949  6/1953  Belgium.

STANLEY N. GILREATH, *Primary Examiner.*

D. WATKINS, *Assistant Examiner.*